Figure 1:
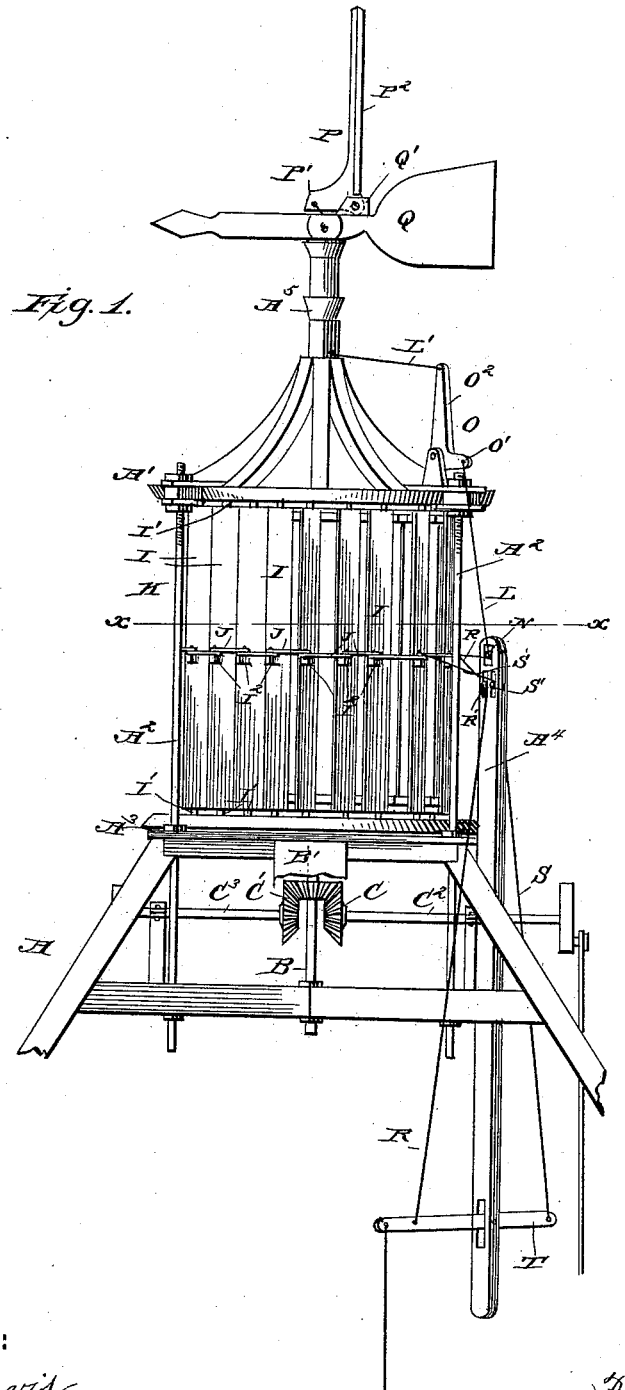

(No Model.) 2 Sheets—Sheet 1.

B. KOEPPE.
WINDMILL.

No. 387,424. Patented Aug. 7, 1888.

WITNESSES:
W. R. Davis
C. Sedgwick

INVENTOR:
B. Koeppe
BY Munn & Co.
ATTORNEYS.

(No Model.) 2 Sheets—Sheet 2.
B. KOEPPE.
WINDMILL.
No. 387,424. Patented Aug. 7, 1888.
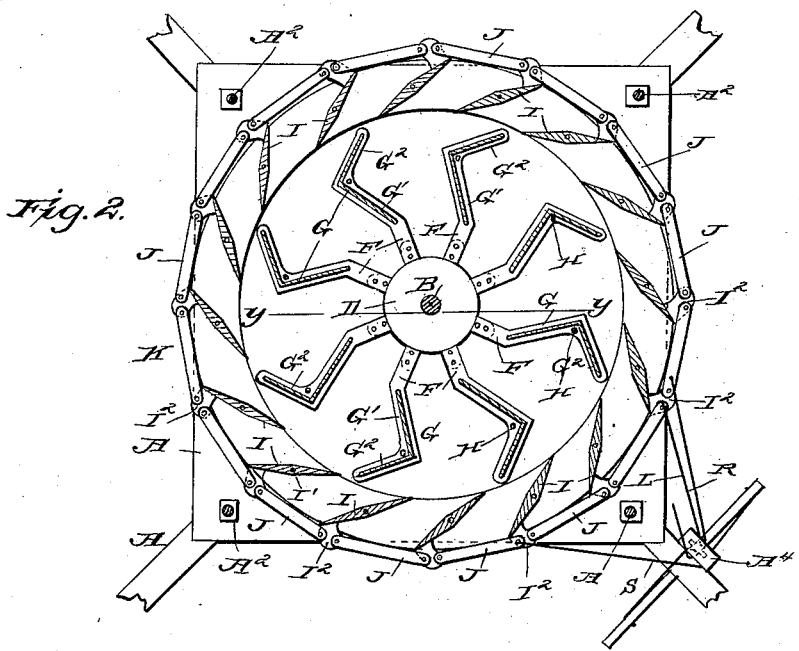
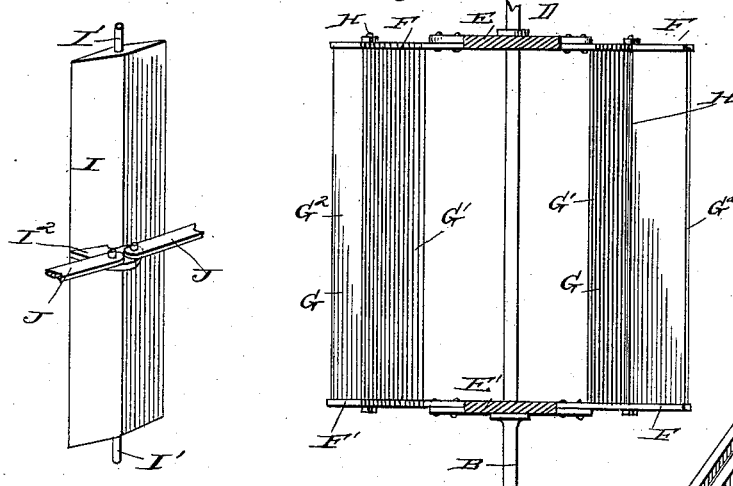
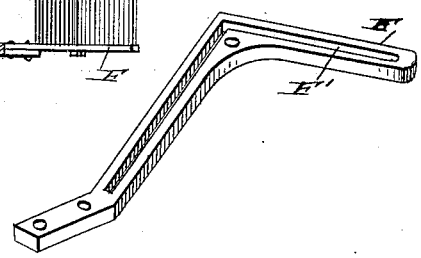
WITNESSES:
W. R. Davis
C. Sedgwick
INVENTOR:
B. Koeppe
BY Munn & Co.
ATTORNEYS.

UNITED STATES PATENT OFFICE.

BERNHARD KOEPPE, OF KEARNEY, NEBRASKA.

WINDMILL.

SPECIFICATION forming part of Letters Patent No. 387,424, dated August 7, 1888.

Application filed March 19, 1888. Serial No. 267,657. (No model.)

*To all whom it may concern:*

Be it known that I, BERNHARD KOEPPE, of Kearney, in the county of Buffalo and State of Nebraska, have invented a new and Improved Windmill, of which the following is a full, clear, and exact description.

The object of the invention is to provide a new and improved windmill which is simple and durable in construction, very effective in operation, and automatically governed in regard to its speed.

The invention consists of a wind-wheel having angular wings and held inclosed in a casing composed of sides adapted to swing open and shut.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a side elevation of the improvement. Fig. 2 is an enlarged plan view of the same on the line $x$ $x$ of Fig. 1. Fig. 3 is a sectional side elevation of the wind-wheel on the line $y$ $y$ of Fig. 2. Fig. 4 is a perspective view of one of the sides of the casing, and Fig. 5 is a perspective view of one of the wind-wheel arms supporting the wind-wheel wings.

A suitably-constructed frame, A, supports at its upper end a head, A', by means of bolts $A^2$, secured in any suitable manner to the upper part of the frame A. In suitable bearings on the main frame A and in the said head A' is mounted to rotate a vertical shaft, B, carrying near its lower end a bevel gear-wheel, B', meshing at opposite sides into bevel gear-wheels C and C', fastened, respectively, to the shafts $C^2$ and $C^3$, mounted to rotate in suitable bearings on the main frame A and connected in any suitable manner with the mechanism to be driven by the wind-wheel.

On the shaft B, between the head A' and the top plate, $A^3$, of the frame A, is secured a wind-wheel, D, provided near its upper end with a disk, E, and near its lower end with a similar disk, E', the said two disks, E and E', being rigidly secured on the main shaft B. On the disks E and E' are secured the angular or L shaped arms F, which extend horizontally and outward in the manner shown in Fig. 2. Each of the arms F is provided with an angular groove, F', and the arms on the upper and lower disks, E and E', correspond with each other, so that the grooves F' are turned toward each other in two corresponding arms in the upper and lower disks, E and E'.

In each corresponding set of arms F is placed a wing, G, consisting of two plates, G' and $G^2$, jointed together at an angle and fitting into the angular grooves F' of the arms F at their top and bottom ends. The wings G are held securely in place by being fitted at their ends into the angular grooves of the arms F of the disks E and E'. Two arms, F, of the upper and lower disks E and E' are also connected with each other and strengthened by screw-rods H, passing through suitable apertures in the corners of the angular arms F, and provided with nuts on the outside screwing against the tops and bottoms of the two corresponding arms F. A very strong wind-wheel is thus built.

The wind-wheel D is inclosed on its periphery in a casing, K, consisting, principally, of a number of sides, I, (shown plainly in Fig. 4,) each side being provided at its ends with trunnions I', fitting in corresponding apertures in the head A' and the top plate, $A^3$, of the frame A, so that the said sides I can turn freely. The sides I are placed in such a relative position to each other that when the sides are closed the respective ends overlap each other, thereby inclosing the periphery of the wind-wheel D completely, so that no wind can get to the wings of the said wind-wheel. On each of the sides I, on the outside, is formed a lug, $I^2$, with which are pivotally connected the arms J, extending from each lug to the next following lug. As the sides I are arranged in a circle around the wind-wheel D, it will be seen that two arms, J, are pivotally connected with each lug $I^2$, as is plainly shown in Fig. 2. The sides I are preferably diamond-shaped in cross-section, so as to permit an easy entrance of the wind to the wind-wheel when the sides are opened.

To one of the arms J is secured one end of a rope, L, passing under a pulley, N, mounted to rotate in the upper end of a post, $A^4$, secured to one side of the main frame A. The rope L, after passing under the pulley N, extends upward and connects with the end O' of a bell-crank lever, O, fulcrumed on top of the head A' and connected by its other arm, O², with one end of a rope, L'. The latter extends inward and passes to the center of a hollow rod, A³, secured to the top of the head A', and then the rope L' passes upward and through the said hollow rod A⁵ and is secured to one end of a bell-crank lever, P, carrying on its other arm a wing, P². The bell-crank lever P is pivotally connected with a lug, Q', formed on a vane, Q, held to turn on the upper end of the rod A⁵, so that when the said vane Q turns, it carries with it the bell-crank lever P and its wing P². To another arm, J, is secured one end of a rope, R, which passes over a pulley, R', mounted in the upper end of the post A⁴, and then the said rope extends downward and is secured to one end of a lever, T, pivoted in the lower part of the post A⁴. To a link on the other side of the post A⁴ is secured one end of a rope, S, which passes over a pulley, S', in the upper part of the post A⁴, and then the said rope S extends downward and is securrd to the other end of the lever T, before mentioned.

The operation is as follows: When the wind-wheel is in the position shown in Figs. 1 and 2, the sides I of the casing K are open, so that the wind coming from any direction can pass through the said open sides I and pass to the angular wings G of the wind-wheel D. The wind is guided into the wind-wheel by the relative position of the said arms I, so that the full force of the wind is concentrated on the angular wings G of the wind-wheel, whereby the latter is rotated, and imparts its rotary motion to the main shaft B, which in any suitable manner transmits it to the mechanism to be operated. When the wind increases in velocity and causes the wind-wheel D to run above the normal speed, the increased velocity of the wind acting on the wing P² of the bell-crank lever P causes the latter to swing so that the wing P² moves downward, thereby swinging the other arm, P', of the bell-crank lever P upward. A pull is thus exerted by the arm P' on the rope L', whereby the arm O² of the bell-crank lever O is swung inward, and the other arm, O', of the said bell-crank lever is swung upward, exerting a pull on the rope L. The latter is thus drawn upward and forward, thereby exerting a forward pull on its respective arm J, which causes the sides I to close, whereby the wind is prevented from entering between the said sides I and passing to the wind-wheel. The sides I of the casing K can also be opened or closed by the operator by moving the lever T, so that either the rope R is pulled downward, thereby closing the sides I, or the rope S is moved downward, so that the sides I are opened as the said ropes R and S are connected to arms J at opposite sides of the post A⁴. Thus it will be seen that the operator is fully enabled to admit any amount of wind to the wind-wheel D so as to increase or decrease its speed.

Having thus described my invention, what I claim as new, and desire to secure by Letters Patent, is—

1. In a windmill, a casing inclosing the wind-wheel and composed of sides held to swing and connected with each other by arms, in combination with two ropes connected at their ends with two of the said arms, a fixed arm carrying pulleys over which pass said ropes coming from opposite directions, and a lever fulcrumed in the said post and to which said ropes are connected at opposite ends, substantially as shown and described.

2. In a windmill, the combination, with a wind-wheel having angular wings, of a casing inclosing the wind-wheel and composed of sides held to swing and connected with each other by arms, two ropes connected at their ends with two of the said arms, a fixed arm carrying pulleys over which pass the said ropes coming from opposite directions, and a lever fulcrumed in the said post and to which the said ropes are connected at opposite ends, substantially as shown and described.

BERNHARD KOEPPE.

Witnesses:
JOHN D. LEWENSTEIN,
JOSEPH A. FLORANG.